(12) United States Patent
Neumeyer et al.

(10) Patent No.: US 9,355,017 B2
(45) Date of Patent: May 31, 2016

(54) AUTOMATED ERROR CHECKING SYSTEM FOR A SOFTWARE APPLICATION AND METHOD THEREFOR

(71) Applicant: III Holdings 4, LLC, Wilmington, DE (US)

(72) Inventors: Frederick Charles Neumeyer, Austin, TX (US); Gabriel Anthony Aguilar, Round Rock, TX (US); Gregory Allen Bryant, Georgetown, TX (US)

(73) Assignee: III Holdings 4, LLC, Wilmington, DE (US)

( * ) Notice: Subject to any disclaimer, the term of this patent is extended or adjusted under 35 U.S.C. 154(b) by 83 days.

(21) Appl. No.: 13/708,522

(22) Filed: Dec. 7, 2012

(65) Prior Publication Data

US 2013/0179865 A1    Jul. 11, 2013

Related U.S. Application Data

(60) Provisional application No. 61/583,926, filed on Jan. 6, 2012.

(51) Int. Cl.
*G06F 9/44* (2006.01)
*G06F 11/36* (2006.01)

(52) U.S. Cl.
CPC .......... *G06F 11/368* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 7,080,357 B2 * | 7/2006 | Foster ................. | G06F 11/3688 717/126 |
| 7,334,162 B1 * | 2/2008 | Vakrat et al. ................. | 714/38.1 |
| 7,480,907 B1 * | 1/2009 | Marolia ..................... | G06F 8/65 717/127 |
| 7,594,220 B2 * | 9/2009 | Kodosky et al. .............. | 717/125 |
| 7,630,708 B2 * | 12/2009 | So et al. ......................... | 455/425 |
| 7,712,083 B2 * | 5/2010 | Coppert ................ | G06F 11/008 717/128 |
| 7,735,065 B2 * | 6/2010 | Jain ................... | G06F 17/30489 717/127 |
| 8,141,043 B2 * | 3/2012 | Jones et al. .................... | 717/124 |
| 8,359,580 B2 * | 1/2013 | Gonzales, II ......... | G06F 11/368 717/128 |
| 8,413,118 B2 * | 4/2013 | Kodosky et al. .............. | 717/125 |
| 8,516,446 B2 * | 8/2013 | Williams et al. .............. | 717/126 |
| 8,566,648 B2 * | 10/2013 | Schroeder ................. | 714/38.14 |
| 8,578,338 B2 * | 11/2013 | Nguyen ................. | G07F 17/32 171/126 |
| 8,620,305 B2 * | 12/2013 | Singh et al. .................... | 455/424 |
| 8,621,434 B2 * | 12/2013 | Campion et al. .............. | 717/124 |
| 8,661,411 B2 * | 2/2014 | Agapi et al. .................. | 717/124 |
| 8,683,462 B2 * | 3/2014 | Goldman ............... | G06F 9/445 717/126 |
| 8,739,125 B2 * | 5/2014 | Petrovick ...................... | 717/126 |

(Continued)

OTHER PUBLICATIONS

Liu, Han, "Failure Proximity: A Fault Localization-Based Approach"; 2006 ACM; [retrieved on Jan. 13, 2016]; Retrieved from Internet <URL: http://dl.acm.org/citation.cfm?id=1181782&CFID=575059846&CFTOKEN=30592802>;pp. 46-56.*

(Continued)

*Primary Examiner* — Xi D Chen
(74) *Attorney, Agent, or Firm* — Perkins Coie LLP

(57) ABSTRACT

A test system for providing automatic testing of an application on a plurality of devices, the system including an input/output device for communicating with the plurality of devices, a processor and a memory that stores instructions which cause the processor to install an application on a device, monitor the device as it performs a series of steps, and record the results of the series of steps in a log.

18 Claims, 5 Drawing Sheets

(56) References Cited

U.S. PATENT DOCUMENTS

| | | | | |
|---|---|---|---|---|
| 8,826,240 | B1* | 9/2014 | Lachwani | G06F 8/30 717/126 |
| 2002/0143997 | A1* | 10/2002 | Huang et al. | 709/248 |
| 2003/0037316 | A1* | 2/2003 | Kodosky et al. | 717/127 |
| 2003/0131285 | A1* | 7/2003 | Beardsley et al. | 714/38 |
| 2006/0037002 | A1* | 2/2006 | Vinberg et al. | 717/124 |
| 2006/0271915 | A1* | 11/2006 | Stefik | G06F 21/10 717/127 |
| 2007/0089091 | A1* | 4/2007 | Larab et al. | 717/124 |
| 2007/0234293 | A1* | 10/2007 | Noller et al. | 717/124 |
| 2008/0052138 | A1* | 2/2008 | Marsh et al. | 705/7 |
| 2008/0127101 | A1* | 5/2008 | Anafi et al. | 717/125 |
| 2008/0244532 | A1* | 10/2008 | Arcese | G06F 11/3495 717/128 |
| 2009/0328028 | A1* | 12/2009 | O'Rourke et al. | 717/173 |
| 2010/0146489 | A1* | 6/2010 | Ortiz | 717/128 |
| 2010/0299654 | A1* | 11/2010 | Vaswani | G06F 11/366 717/128 |
| 2011/0029957 | A1* | 2/2011 | Shufer | G06F 11/3688 717/127 |
| 2011/0231936 | A1* | 9/2011 | Williams et al. | 726/25 |
| 2012/0233235 | A1* | 9/2012 | Allaire et al. | 709/201 |
| 2012/0266157 | A1* | 10/2012 | Mun et al. | 717/174 |
| 2012/0317548 | A1* | 12/2012 | Olsa | G06F 11/3664 717/127 |
| 2013/0179858 | A1* | 7/2013 | Mecke et al. | 717/106 |
| 2015/0058826 | A1* | 2/2015 | Hu | G06F 11/362 717/128 |

OTHER PUBLICATIONS

Runeson, et al., "(Detection of Duplicate Defect Reports Using Natural Language Processing"; 2007 ACM; [retrieved on Jan. 13, 2016]; Retrieved from Internet <URL: http://dl.acm.org/citation.cfm?id=1248882&CFID=575059846&CFTOKEN=30592802>;pp. 1-10.*

Bhattacharya, et al., "An Empirical Analysis of Bug Reports and Bug Fixing in Open Source android Apps"; 2013 IEEE; [retrieved on Jan. 13, 2016]; Retrieved from Internet <URL: http://ieeexplore.ieee.org/stamp/stamp.jsp?tp=&arnumber=6498462>;pp. 113-143.*

Choudhary, et al., "WEBDIFF: Automated Identification of Cross-browser Issues in Web Applications"; 2010 IEEE; [retrieved on Jan. 13, 2016]; Retrieved from Internet <URL: http://ieeexplore.ieee.org/stamp/stamp.jsp?tp=&arnumber=5609723>;pp. 1-10.*

* cited by examiner

AUTOMATED ERROR CHECKING SYSTEM FOR A SOFTWARE APPLICATION AND METHOD THEREFOR

CROSS-REFERENCE TO RELATED APPLICATION(S)

This application is a non-provisional of and claims priority to Provisional Application No. 61/583,926 filed on Jan. 6, 2012 and entitled "AUTOMATED ERROR CHECKING SYSTEM FOR A SOFTWARE APPLICATION," which is incorporated herein by reference in its entirety.

FIELD

This disclosure relates generally to system and method of automating error checking for a software application, and more particularly for a software application configured to operate on a portable computing system, such as a smart phone.

BACKGROUND

Application development has become a major industry worldwide. The industry has grown as the demand for portable phones, has increased. Today, more and more applications are being written at a faster and faster pace as developers try to fill the demand.

One major cost to application developers includes costs associated with staffing of sufficient programmers to provide adequate error and bug checking. Further, when testing code executing on phones, an additional cost includes the cost of purchasing sufficient variety of phone models to ensure error free code for most end users. This is a particular problem for developers because of the great plurality of phones and operating system versions that have been released. Designing an application to run on all platforms requires significant error checking. Releasing an application with too many errors often can be disastrous for company. In response to the needs of the developers, many companies offer manual error and bug testing services for application developer companies. These companies hire programmers to apply series of test protocols in order to discover errors or bugs in the application and to report a bug to the developers. While the error testing firms are able to reduce the staffing costs of the application developers, such companies typically charge hourly rates for software testing, so the costs associated with error testing remain high.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

Embodiments of systems and methods are disclosed below that provide an automated and/or remote error testing for application software intended for a plurality of devices and operating systems. The system is configured such that the application may be added or uploaded to an application source. A test system is able to access the application, install the application on to one or more devices, provide a data stream including at least one command to the application, and record test and error records as the application executes the data stream. The test system is configured to install the application on the one or more devices and execute new sequences of random commands. Each time an error occurs; the test system logs the error and attempts to reproduce the error under the same conditions, before trying to reproduce the error on other types of devices and operating systems connected to the test system. An example of a software application testing system is described below with respect to FIG. 1.

Figure 1:
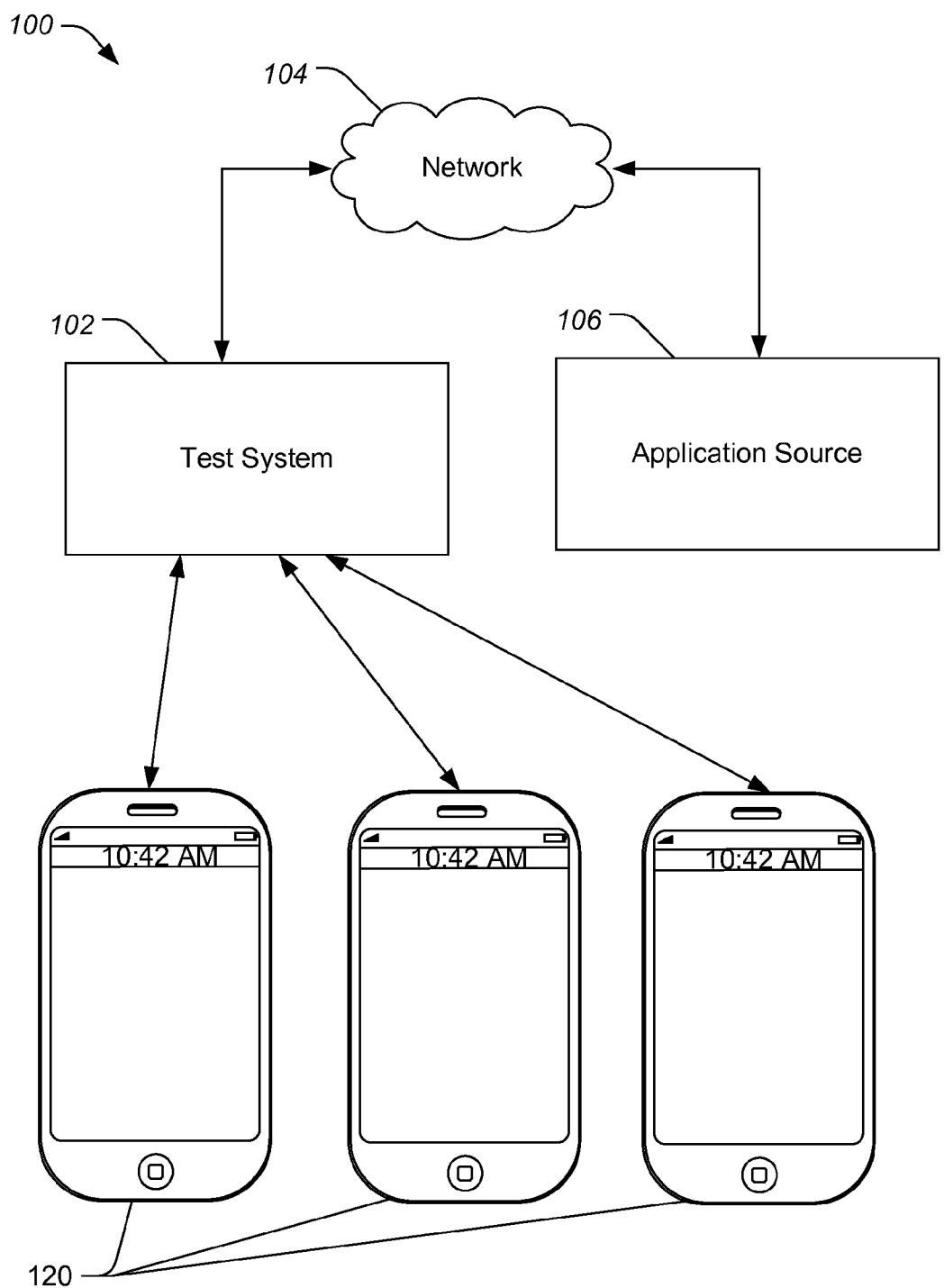
FIG. 1 is a diagram of a system including a testing system for providing automated error testing of an application executable on a plurality of devices.

FIG. 1 is a pictorial view of a system 100 for providing automated error testing of an application on a plurality of devices 120. System 100 includes a test system 102 configured to communicate with an application source 106, possibly through network 104 (such as the Internet), and with the plurality of portable devices 120 through an input/output interface such as a universal serial bus (USB) interface or a wireless transceiver. The plurality of portable devices 120 are portable personal computing devices such as a smart phone or tablets.

Application source 106 may be a database, a code repository system (such as the Kiln® or FogBugz® systems commercially available through www.fogcreek.com), a user interface, a website, or other system for receiving and storing applications. Application source 106 may include code versioning or other application tracking features.

In one example, the application source 106 may be a memory in test system 102. In one embodiment, test system 102 accesses application source 106 to see if any applications have been uploaded, or if any changes to existing applications have been uploaded for error testing. If test system 102 finds an application ready for testing in application source 106 it downloads the application through network 104. Test system 102 selects one of the portable devices 120 and clears the memory before installing the application on the portable device 120. Test system 102 may select the portable device 120 based on a random selection algorithm, by checking the availability of the plurality of the portable devices, or by selecting a portable device on which the application has not previously been tested.

Once the application has been installed, test system 102 generates a random data stream including at least one command, and provides the data stream to the application. While the application executes the command, test system 102 monitors the execution of the application and the state of the portable device to generate a test record. The test record may include the data stream, the device make and manufacture, the operating system name and version, the start and end state of the portable device, any error including error messages, and the results produced by the application after processing the data stream. Test system 102 then stores the test record in a log which is made available to the user directly through the test system 102, the application source 106, or email.

In an embodiment, test system 102 is a client system and application source 106 is a web interface or website accessible by a user for the uploading, testing, versioning, and tracking of software application code. Application source 106 is configured to provide the applications uploaded by a user to test system 102 which preforms the error testing. In this way system 100 is able to provide a software application testing service over the internet or other networks. In another embodiment, test system 102 may be an executable file that may be run to install the test system program on a user computer. In this embodiment, application source 106 may a memory location on the user computer or provided as a remote database which the test system program is able to access through a network. Thus, test system 102 may be sold as software program or a software program bundled with code versioning and backup services.

Figure 2:
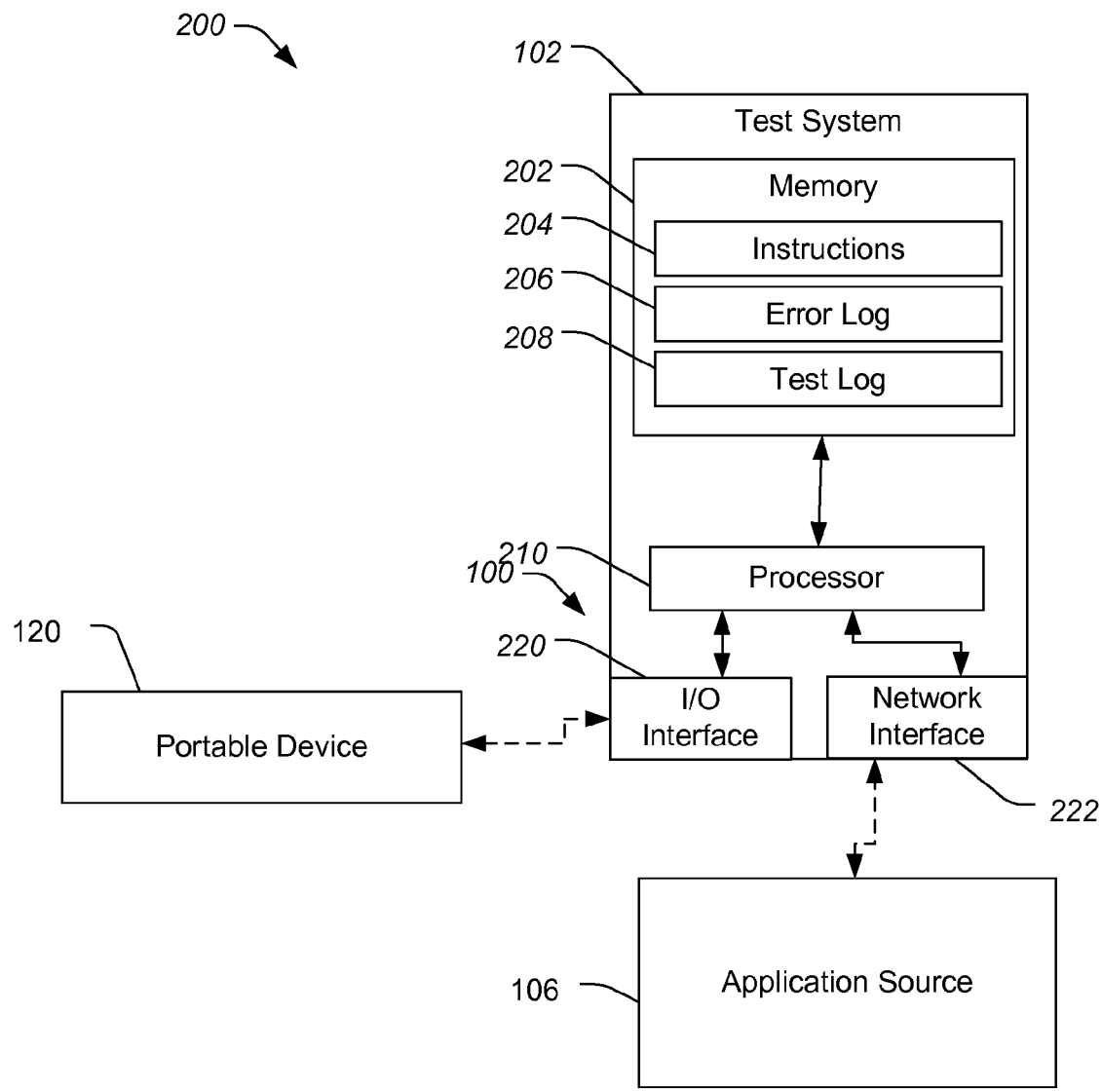
FIG. 2 is a block diagram of an embodiment of the system of FIG. 1.

FIG. 1 shows a representative example of one possible embodiment of an automated error checking system. FIG. 2 shows a more detailed block diagram of the system of FIG. 1.

FIG. 2 is a block diagram of an embodiment 200 of system 100 of FIG. 1. In the illustrated example, test system 102 includes a processor 210 and a memory 202 coupled to processor 210 and configured to store instructions 204, at least one error log 206, and at least one test log 208. Test system 102 also includes an input/output interface 220 configured to communicate with a plurality of portable devices 120 and a network interface 222 which is configured to communicate with an application source 106.

Error log 206 includes error records generated by test system 102 while running an application on at least one of the plurality of portable devices 120. Test log 208 includes test records that resulted from running a series data streams on the plurality of portable devices. It should be understood that error log 206 and test log 208 may be a single combined log.

Instructions 204, when executed by processor 210, and cause processor 210 to fetch an application from application source 106, select one of portable device 120 coupled to input/output interface 220, and install the application on the selected portable device. Instructions 204 further cause processor 210 to initiate execution of the application on the selected portable device 120, generate a random data stream including at least one command, and provide the data stream to the selected portable device through the input/output interface 220. In-addition to the at least one command, the data stream may also include additional commands, instructions, random data, and/or memory addresses. In one example, the data stream is generated randomly. In another example, the data stream is predetermined by a user.

Instructions 204 further cause processor 210 to monitor the execution of the application as it processes the data stream. Instructions 204 also cause processor 210 to generate a test record including the device make and manufacture information, operating system information including version, start and end state of portable device 120, any error with messages that may have occurred, and the results. Processor 210 then stores the test record as an entry in test log 208. If an error occurred, instructions 204 further cause processor 210 to generate an error record including the data stream, the error, and the make, model, and operating system version and store such data in error log 206 in addition to recording the test record in test log 208.

In one embodiment, after the error record is entered in error log 206, instructions 204 cause processor 210 to uninstall the application from the selected portable device 120 returning to a clean state. Thus, processor 210 re-installs the application and provides the application the same data stream that caused the error. If the error occurs once again, then processor 210 marks the error as repeatable in the error record. By placing the portable device 120 into a clean state before running every test, test system 102 is able to ensure that the every error detected is actually caused by the application responding to the data stream and not because of the effects of previous test. It should be understood, that test system 102 when returning the portable device 120 to a clean state may return the device all the way back to the manufacturing settings. It should also be understood, that test system 102 may place portable device 120 in a clean state between tests even if an error did not occur.

If the error does not occur once again, than test system 102 may do several things. In one example, processor 210 uninstall the application from the selected portable device 120 returning to a clean state, installs the application, launches the application, provides the application the data stream, and monitors the application. This provides verification that there were no anomalies in during the second attempt. In another example, processor 210 may run the test on another of the portable devices 120 identical to the selected portable device 120 to confirm that there is not a hardware issue.

In another embodiment, after the error record is entered in error log 206, instructions 204 cause processor 210 to select a second portable device 120 of different make, manufacture, or operating system version than the previously selected portable device 120. Processor 210 then clears the memory of the second device, installs the application, and provides the application the same data stream that caused the error. If the error occurs again on the second device then processor 210 marks the error as repeatable and the additional make, model, or operating system version of the second device in the error record.

Figure 3:
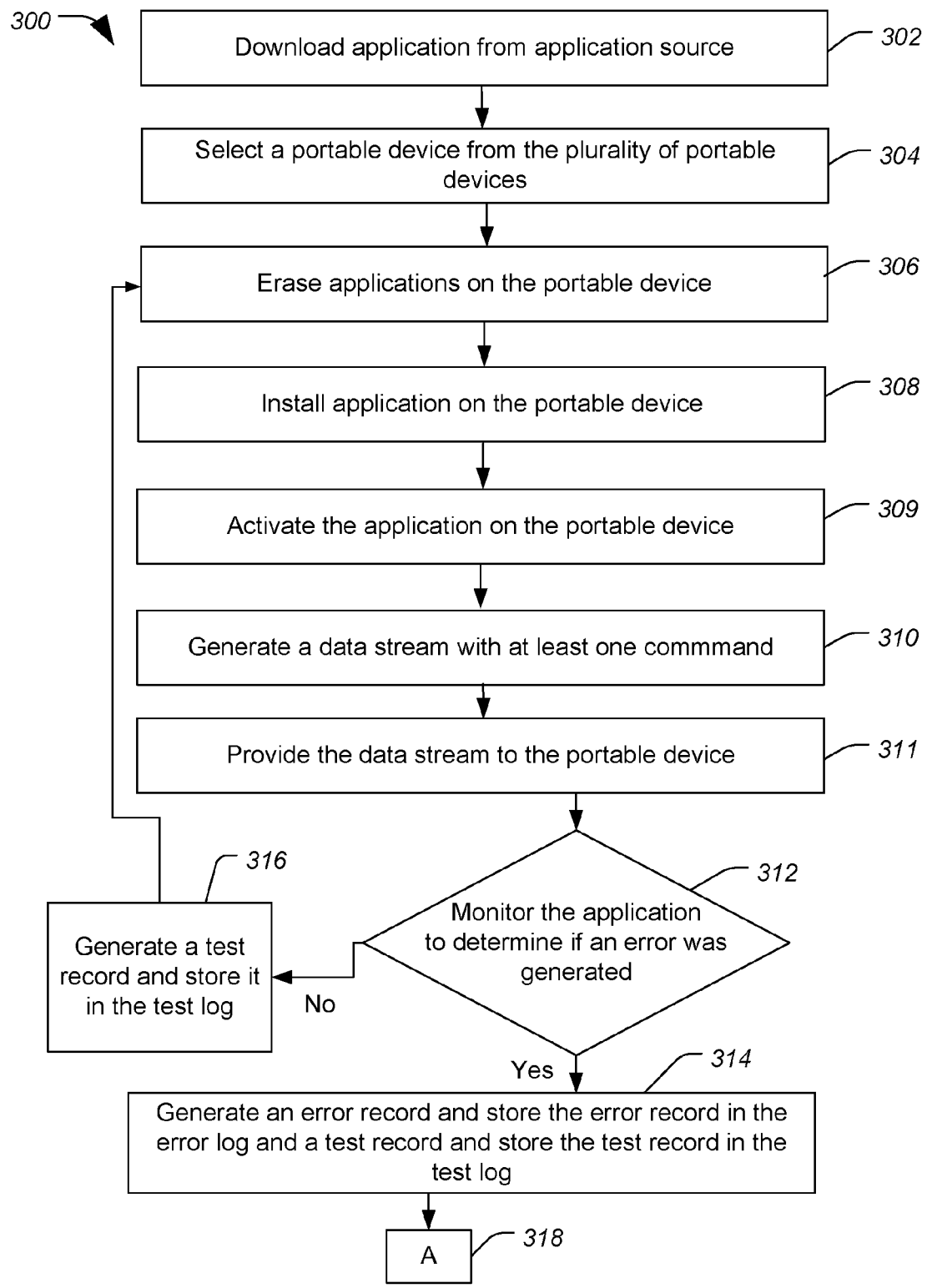
FIG. 3 is a flow diagram of an embodiment of a method of providing automated error testing for an application on a portable device.

FIG. 2 shows a block diagram of system 100 of FIG. 1, while FIG. 3 shows a flow diagram of the instructions executed by processor 210 when preforming the error testing.

FIG. 3 is a flow diagram of an embodiment of a method 300 of providing automated error testing for an application on a portable device, such as the plurality of portable devices 120 of FIGS. 1 and 2. At 302, test system 102 downloads an application from an application source, proceeds to 302 where test system 102 prepares an error test with random data steam. At 304, test system 102 selects a portable device from a plurality of portable devices. Proceeding to 306, test system 102 erases all applications on the selected portable device. Continuing to 308, test system 102 installs the downloaded application on the selected portable device and advances to 309. At 309, test system 102 activates the installed application on the portable device. Proceeding to 310, test system 102 generates a ransom data stream including at least one command and advances to 211 where test system 12 provides the data stream to the selected portable device. Advancing to 312, test system 102 monitors the application to determine if an error was generated, if not advances to 316 generates a test record and stores it in test log 208 and method 300 returns to 301. If an error was generated method 300 proceeds to 314 and generates an error record which it stores in error log 206 and a test record which it stores in test log 208.

Figure 4:
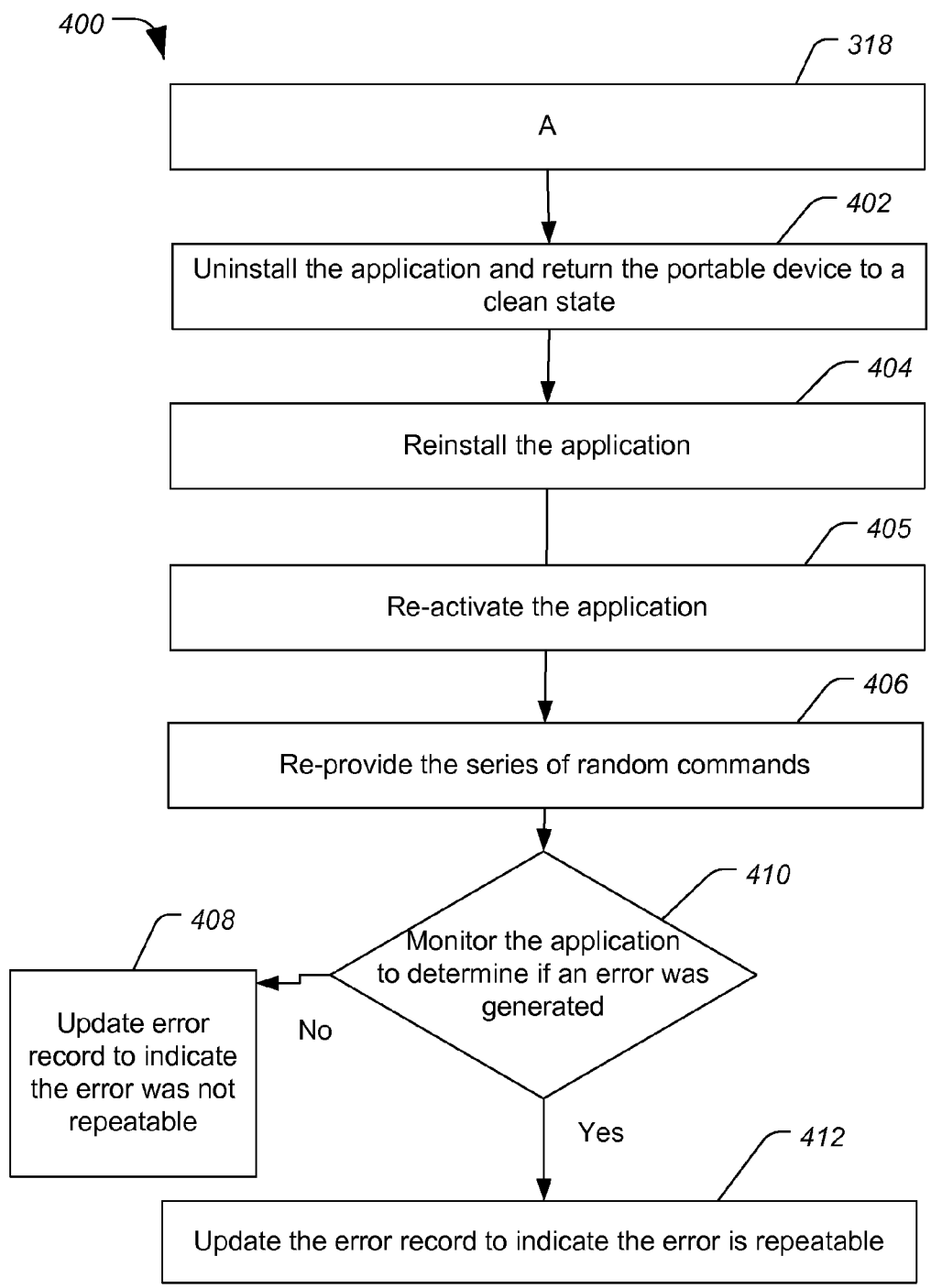
FIG. 4 is a flow diagram of an embodiment of a method of providing automated error repeatability confirmation for an application on a portable device.
Figure 5:
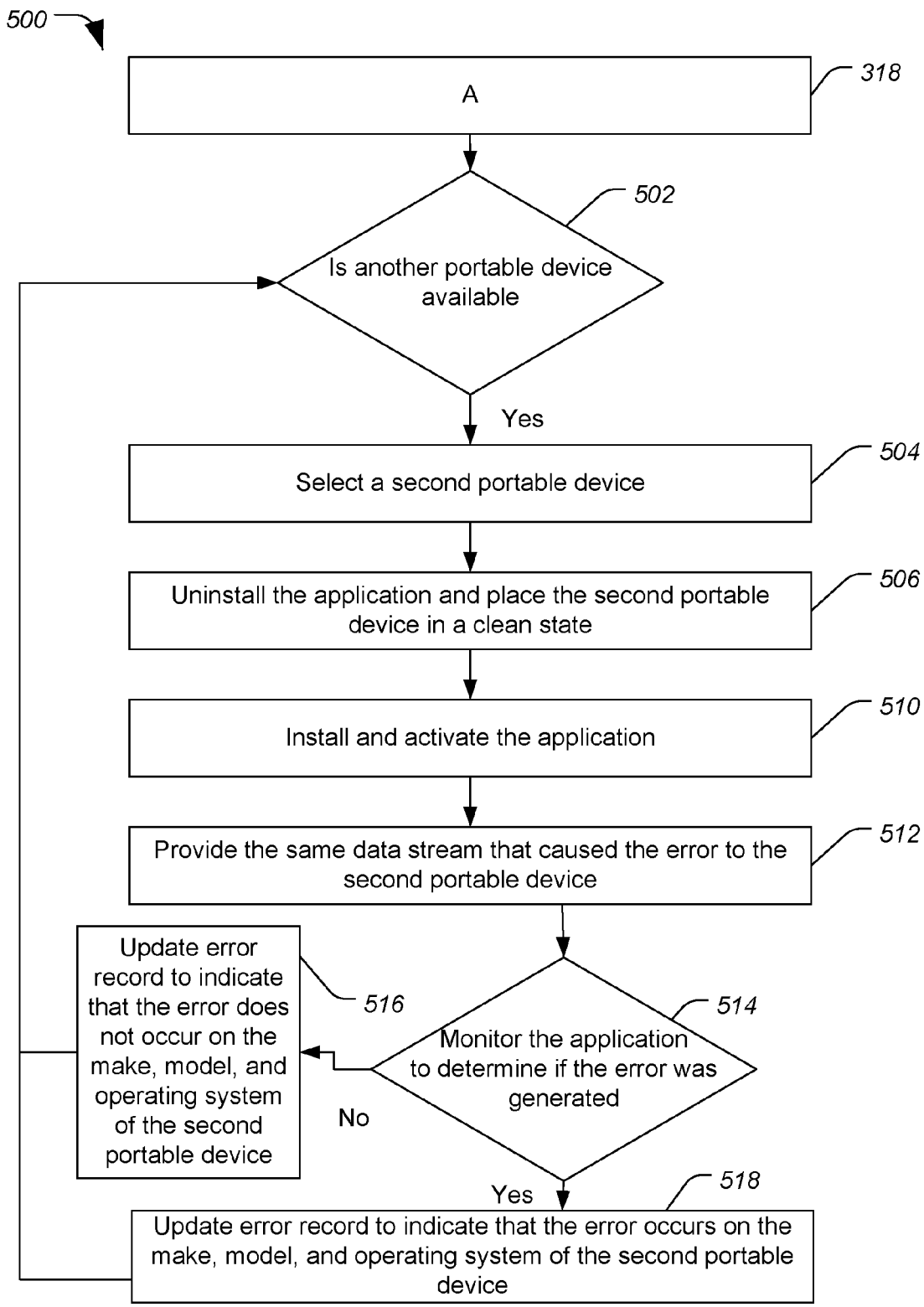
FIG. 5 is a flow diagram of an embodiment of a method of providing automated error testing for an application on a plurality of portable devices.

After the error record is recorded in error log 206 proceeds to 318 and method 300 of FIG. 3 ends. FIGS. 4 and 5 show a flow diagram of test system 102 conducting continued error testing starting at 318.

FIG. 4 is a flow diagram of an embodiment of a method 400 of providing automated error confirmation for an application on a portable device. Starting at 318, method 400 proceeds to 402 and test system 102 uninstalls the application from the selected portable device and returns the device to a clean state. By returning the device to a clean state test system 102 is able to ensure that the error detected in method 300 is not affecting method 400. Advancing to 404, test system 102 re-installs the application on the selected portable device and, advances to 505 where test system 102 re-activates the application. Proceeding to 406, and re-provides the data stream that caused the error to the application. Proceeding to 410, test system 102 monitors the application to determine if the error reoccurs, if it does not method 300 proceeds to 408 updates the error record to indicate the error was not repeatable and method 400 ends. Test system 102 at this time may begin a new error test by returning to 302 of FIG. 3 or preform a triple check on the error by returning to 402 and rerunning method 400. If, however, an error does occur method 400 proceeds to 412 and the error record is updated to indicate the error is repeatable and method 400 ends. Again as explained above when method 400 ends, test system 102 may begin a new error test by returning of 302 of FIG. 3.

FIG. 4 is a flow diagram of method 400 which proceeds from 318 and provides additional blocks to confirm an error is repeatable using the selected portable device, while FIG. 5 is a flow diagram also proceeding form 316 which provides additional blocks for checking for the error detected at 312 is reproducible on other portable devices, other operating system versions, and/or other operating systems.

FIG. 5 is a flow diagram of an embodiment of a method 500 of providing automated error testing for an application on a plurality of portable devices. Starting at 318, method 500 proceeds to 502 and test system 102 checks to determine if another portable device is available for testing the application. If not method 500 ends. Test system 102 at this time may begin a new error test by returning to 302 of FIG. 3. However, if another portable device is available method 500 advances to 504. Test system 102 may determine that a portable device is available for example by determining if another device is connected, if a device with another make, model, or operating system version is connected, or by determining if any devices connected are not in use, or various other known methods.

At 504, test system 102 selects one of the available portable devices as a second test device and proceeds to 506 where test system 102 clears memory and returns the second test device to a clean state. Advancing to 510, test system 102 installs and activates the application on the second test device and proceeds to 512 where test system 102 provides the same data stream that caused the error to the second test device. Advancing to 514, test system 102 monitors the second test device to determine if the error re-occurs on the second test device. If the error does not occur, method 500 proceeds to 516 and test system 102 modifies the error record to indicate that the error does not occur on the make, model, and operating system of the second test device and method 500 returns to 302. However, if the error does occur, test system 102 modifies the error record to indicate that the error reoccurred on the make, model, and operating system of the second test device. Test system 102 may also include any differences that occurred in the state, error message, or result between the selected portable device and the second test device. After modifying the error record, method 500 returns to 502.

It should be understood that in one particular embodiment of method 300, method 300 in combination with method 400, or method 300 in combination with method 500 may be implemented as a continuous loop, such that at 318, 412 or 502 the methods may return to 302 and begin another test. In this embodiment, the method may be ended when a threshold number of errors have occurred, test system 102 has lost connection with all of the portable devices, a timer expires, or a user enters a command to end the testing.

Although the present invention has been described with reference to preferred embodiments, workers skilled in the art will recognize that changes may be made in form and detail without departing from the scope of the invention.

What is claimed is:

1. A test system comprising:
one or more processors;
an input/output interface coupled to the one or more processors to communicate with a plurality of portable devices through a communication channel, the plurality of portable devices comprising a first portable device executing a first version of an operating system and a second portable device executing a second version of the operating system;
a memory coupled to the one or more processors and storing instructions that, when executed by the one or more processors, cause the one or more processors to:
  detect a new application added to an application source by a third party, wherein the new application is in a debugging phase;
  select the first portable device based at least in part on an availability of the first portable device;
  install the new application on the first portable device and the second portable device;
  start execution of the new application on the first portable device and the second portable device;
  provide a first data stream including at least one command executable by the new application to the first portable device and a second data stream including at least one command executable by the new application to the second portable device; and
monitor execution of the data streams by the new application on the first portable device and the second portable device to generate a test record wherein the generated test record includes:
  a first error message associated with the first portable device and a second error message associated with the second portable device; and
  differences between the first error message and the second error message.

2. The test system of claim 1, wherein the first error message is generated when an error occurs during execution of the data stream by the application on the first portable device.

3. The test system of claim 1, further comprising a web-interface for allowing the third party to upload the application to the application source.

4. The test system of claim 1, further comprising:
a network interface coupled to the one or more processors to communicate with the application source through a network; and
wherein the instructions when executed by the one or more processors further cause the one or more processors to:
  fetch the new application from the application source before installing the new application on the first portable device and on the second portable device.

5. The test system of claim 3, wherein the third party can view the test record through the web-interface.

6. The test system of claim 3, wherein the third party selects a subset of the plurality of portable devices to install the application on using the web-interface.

7. The test system of claim 1, wherein the instructions when executed by the one or more processors further cause the one or more processors to execute the new application on the plurality of portable devices in parallel.

8. The test system of claim 1, wherein the instruction when executed by the one or more processors further cause the one or more processors to execute the new application on the plurality of portable devices in series.

9. A computer-implemented method comprising:
    detecting an application added to an application source by a user through a web-interface, wherein the application is in a debugging phase;
    receiving a selection of a subset of a plurality of portable devices from the user through the web-interface, the plurality of portable devices comprising a first portable device executing a first operating system and a second portable device executing a second operating system; and
    testing the application on the subset, wherein the testing includes:
        fetching the application from the application source;
        installing the application on the subset of the plurality of portable devices;
        providing a data stream including at least one command executable by the application to the subset of portable devices;
        monitoring execution of the data stream by the application on the subset of portable devices; and
        generating a test record in response to monitoring the execution of the data stream by the application on the subset of portable devices, the test record including differences that occurred in a result between the subset of the plurality of portable devices, wherein individual portable devices in the subset of the plurality of portable devices include an associated state, and wherein the test record includes differences between the states.

10. The method of claim 9, wherein the generating a test record comprises:
    detecting an error during the execution of the data stream;
    generating an error record in response to detecting the error; and
    including the error record in the test record.

11. The method of claim 10, wherein the testing further includes:
    uninstalling the application from the at least one of the subset of portable devices;
    reinstalling the application on the at least one of the subset of portable devices;
    providing the data stream to the at least one of the plurality of portable devices; and
    monitoring the execution of the data stream by the application on the at least one of the plurality of portable devices to determine if the error reoccurred.

12. The method of claim 10, wherein the testing further includes:
    installing the application on a second subset of the plurality of portable devices;
    providing the data stream to the second subset of portable devices; and
    monitoring the execution of the data stream by the application on the second subset of portable devices to determining if the error occurs on the others of the plurality of portable devices.

13. The method of claim g, further comprising making the test record available to the user at the web-interface.

14. A computer-implemented method comprising:
    detecting a new application added to an application source, wherein the new application is in a debugging phase;
    selecting a first portable device and a second portable device from a plurality of portable devices based at least in part on an availability of the portable devices;
    installing the application on the first portable device and on the second portable device, the first portable device from a first manufacturer and the second portable device from a second manufacturer;
    providing a data stream including at least one command executable by the application to the new application installed on both the first portable device and the second portable device;
    monitoring execution of the data stream by the new application; and
    generating a test record in response to monitoring the execution, wherein the generated test record includes:
        a first error message associated with the first portal device and a second error message associated with the second portable device; and
        differences between the first error message and the second error message.

15. The method of claim 14, further comprising:
    requesting the application from the application source through a network; and
    receiving the application from the application source.

16. The method of claim 15, further comprising:
    providing the test record to the application source through the network.

17. The method of claim 15, further comprising:
    providing the test record to a user through email.

18. A computer-readable storage device comprising computer-executable instructions, that when executed on one or more processors, cause at least one of the processors to perform the method as recited in claim 9.

* * * * *